United States Patent [19]

Udvardi-Lakos

[11] 4,020,360
[45] Apr. 26, 1977

[54] INVERTER CONTROL SYSTEM

[75] Inventor: János Udvardi-Lakos, Erlangen, Germany

[73] Assignee: Siemens Aktiengesellschaft, Munich, Germany

[22] Filed: Sept. 26, 1975

[21] Appl. No.: 617,176

[30] Foreign Application Priority Data

| Sept. 27, 1974 | Germany | 2446299 |
| Oct. 8, 1974 | Germany | 2447951 |
| Feb. 24, 1975 | Germany | 2507866 |
| July 8, 1975 | Germany | 2530465 |
| July 17, 1975 | Germany | 2532056 |

[52] U.S. Cl. .................... 307/66; 321/19; 321/45 S
[51] Int. Cl.² ........................................ H02J 9/06
[58] Field of Search ............. 307/64, 66; 321/19, 321/45 S

[56] References Cited

UNITED STATES PATENTS

| 3,227,940 | 1/1966 | Gilbert et al. | 307/64 |
| 3,229,111 | 1/1966 | Schumacher et al. | 307/66 |
| 3,366,797 | 1/1968 | Baude | 307/66 |
| 3,848,175 | 11/1974 | Demarest | 321/19 |

Primary Examiner—William H. Beha, Jr.
Attorney, Agent, or Firm—Kenyon & Kenyon Reilly Carr & Chapin

[57] ABSTRACT

In an inverter having a control unit with a drive unit and a control device, an enabling unit for firing pulses is coupled between the inverter and the control unit. In standby operation the enabling unit blocks the transmission of firing pulses while the drive unit and control device continue to operate. Furthermore, during standby operations, measures are taken to feed a control voltage to the drive unit which is correct for any starting instant so that upon a starting command, a command unit causes the enabling unit to enable the transmission of the firing pulses to the inverter.

23 Claims, 15 Drawing Figures

INVERTER CONTROL SYSTEM

BACKGROUND OF THE INVENTION

This invention relates to inverters in general and more particularly to an inverter of the type having a control unit containing a drive unit and control device which is arranged to be ready for immediate startup.

Static inverters are sometimes used for emergency power supplies. Such emergency power supplies must be ready to take over the load at any instance. In general there are three methods for starting such static inverters. In a power supply which is truly free from interruptions, the load is supplied continuously through an inverter connected to a battery whose charging unit is connected to a supply system. If the supply system fails, the load continues to be supplied without interruption. The charging equipment is designed so that it can simultaneously deliver the full power rating of the inverter, and after a network failure, can recharge the battery. Thus, the charging unit is relatively large. The efficiency of the overall installation is poor because of the continuous double energy conversion.

If the consumer can tolerate an interruption of his power supply of the order of magnitude of the switching time of contactors, then a system in which the load is normally fed from the power system and switched to the inverter only upon failure can be used. In a standby condition the inverter operates at no-load. In such no-load operation, the firing pulses of the control unit in the inverter passes through to the control rectifiers of the power stage, the commutation circuits of which are also operating. The inverter supplies a no-load output voltage. The charging unit for the inverter must supply, in addition to the charging power after a network failure, power for the continuous idling losses of the power stage of the inverter. Since idling losses of an inverter are approximately 5% of its nominal power, the efficiency of such an installation is also poor.

If the consumer can tolerate an interval in switching over of approximately 1 second duration, systems in which the load is suppled from the network or supply system in normal operation with the inverter switched off can be used. The charging unit simply keeps the battery on a trickle charge. If the power supply fails, the inverter is switched on and after it has reached its operational state, i.e. in about 1 second, the load is connected to it. With such a system the charging unit can be of minimum size since it only need recharge the batter after a power system failure. In normal operation, the efficiency is quite favorable. However, the long interruption in resupplying the load, i.e. the 1 second start-up time is a considerable disadvantage in many applications.

Thus, it can be seen that by using the prior art systems one must either give up efficiency or tolerate unduly long interruptions. In view of this, the need for an improved system which is efficient and which at the same time provides immediate startup becomes evident.

SUMMARY OF THE INVENTION

The present invention provides such a system which permits controlling an inverter in particularly fast manner causing it to go from a standstill to full power output almost immediately. In accordance with the present invention, this is accomplished by coupling, between the control unit and the power stage of the inverter, an enabling unit which blocks the transmission of firing pulses from the control unit in standby operation. The control unit continues to operate during standby operation so that a control voltage correct for any possible starting instant is fed to the control unit. However, the inverter itself does not operate. In addition, means are provided to cause the enabling unit to begin to feed signals to the rectifiers in the inverters upon a starting command caused by failure in the network.

The present invention is based on, in part, the discovery that the amount of time required for start-up is substantially influenced by the time constant of the control arrangement. The time constant of the control device which generally contains an integrating controller is chosen to be relatively large in order to insure good control dynamics during operation under load. What this means, however, is that, when the control device is switched on, the regulating transient is likewise relatively long and lasts for several of the inverter output voltage cycles. Only after this transient is terminated does the drive unit receive the correct control voltage from the control unit, this voltage determining the proper firing angle for the required power output. In the inverter of the present invention, this disadvantage is completely eliminated by having the correct control voltage fed to the drive unit even during standby operation. As a result, its firing pulses are already at the correct firing angle for any possible starting instance and the system can be enabled without delay or at most, with a small delay. Upon start-up the inverter can then deliver its full rated power immediately.

Only minimal additional operating costs over the type system where the inverter is normally completely shut down accrue through continuous operation of the control unit. These circuits are low-power circuits. The major losses and noise in the power stage of the inverter which are due primarily to transformers and chokes do not occur in standby operation.

In one particularly advantageous embodiment of the invention, an inverter model, fed by the firing pulses of the drive unit and which operates during standby operation, is used to determine a synthetic actual voltage which, in standby operation, is coupled through a double throw switch, controllable by the command unit, to the control variable input of the control device which also operates during standby operation. This insures that the control device always has the proper control voltage. The command unit then switches the control variable input of the control device from the synthetic actual voltage to the measured value of the inverter output voltage after the power stage of the inverter has been started. In the illustrated embodiment, the inverter model is constructed in a very simple manner using known digital components.

Another illustrated embodiment utilizes a servo follow-up arrangment which forms a correction voltage from measured values of the load voltage and/or load current and signals of the drive unit. The correction voltage and measured value of the inverter output voltage are coupled through switching means controlled by the command unit to the control device during standby operation. Upon a starting command, the command unit disconnects the correction voltage. The voltage value of the d.c. source, referred to the load current, is preferably used as the inverter input voltage. The advantage of this embodiment lies in the fact that it can be retrofitted in the simple manner on existing inverters.

A further illustrated embodiment provides an additional auxiliary inverter of small power rating. Its d.c. inputs are connected to the same d.c. voltages and its a.c. outputs connected, in parallel with the a.c. voltage of the inverter, to the output transformer of the inverter. For both inverters a common, continuously running control device having a drive unit, and a controller or control device is provided with its firing pulses fed through an enabling unit controlled by the command unit to the controlled rectifiers of the power stage and the controlled rectifiers of the auxiliary inverter. In this embodiment the auxiliary inverter is operative during standby operation and generates an output voltage which is fed to the control device in the usual manner. As a result, the control device is fully engaged during standby operation. When the power inverter itself is started up, it is not necessary to perform any switching operations in the control arrangement.

In an additional embodiment of the invention, a switching device which blocks the control device in standby operation and a continuosly running computing device are utilized along with a summing member. The computing device has at its input the measured values of the active components of the load current and a value for the inverter input voltage. Provision is made for the output voltage of the computing device and the output voltage of the control device to be fed to the summing means whose sum voltage then forms the control voltage for the drive unit. In this embodiment the command means enables the control device through the switching device upon a starting command. The advantage of this embodiment is that the control voltage required by the drive unit is furnished very accurately by a computing device while the control device is blocked in standby operation. In the event of a starting command the control device is enabled and generates a correction signal for the computed control voltage if the latter deviates from the actually required control voltage.

DETAILED DESCRIPTION OF THE PREFERRED EMBODIMENT

Figure 1:
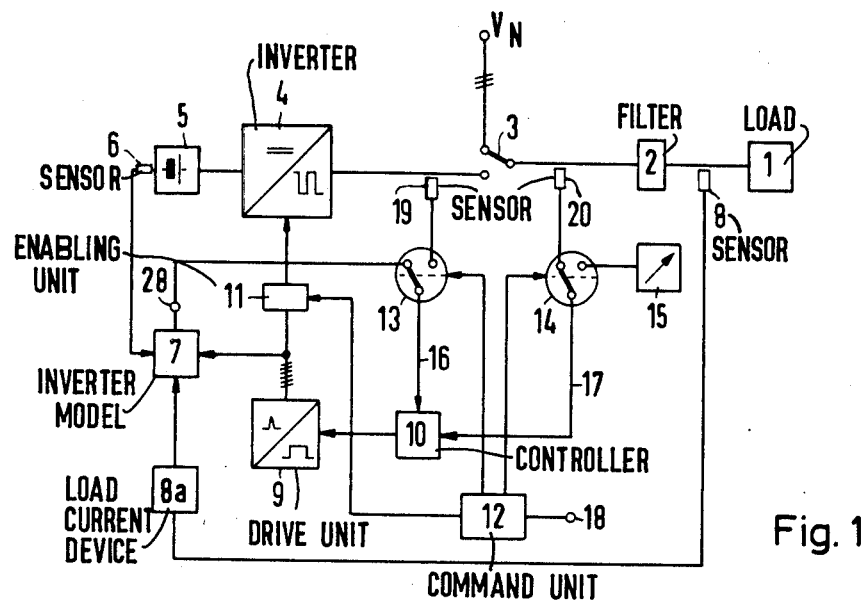
FIG. 1 is a block diagram illustrating an interruption-free power supply according to one embodiment of the present invention utilizing an inverter model.

FIG. 1 is a block diagram illustrating a first interruption-free power supply according to the present invention. As illustrated, a load 1 is coupled through a filter 2 and a switching device 3 to the line voltage $V_N$. The switch in its other position couples the load 1, through the filter 2, to the output of the power stage of an inverter 4. The inverter 4 is supplied from a d.c. source 5. The filter 2 is used attenuate high and low frequency distortions of the line voltage when operated from the line and in emergency operation filters the output of the inverter. When switching from the operation to emergency operation the filter also acts an energy storage device to take over the supply of the load 1 for a short period of time. If the user can tolerate a supply voltage rich in harmonics and having brief interruptions, the filter 2 can be omitted.

Associated with the inverter 4 is a conventional drive unit 9 having as its input the output of a conventional controller or control device 10 which will typically be an integrating controller. The output of the drive unit 9, in accordance with the present invention, is coupled through an enabling unit 11 to the inverter 4. As is well known by those skilled in the art, the controller may be designed as a voltage regulator or as a load regulator. In the following discussion its operation in a voltage regulation mode will be described. However, it will be recognized by those skilled in the art that load regulation may also be used in the present invention.

In addition, and in accordance with the present invention, an inverter model 7 is also provided. Inputs to the inverter model 7 are obtained from a sensor 6 measuring the voltage of the d.c. voltage source 5, a load current device 8a obtaining its input from a current sensor 8, i.e. a current transformer, and the outputs of the drive unit 9. i.e. the firing pulses for the inverter. Also included is a command unit 12 which provides an output to the enabling unit 1. The output of the inverter model at terminal 28 is coupled through a switch 13 when in the position shown as an input on line 16 to the controller 10. This is the control variable input of the controller. The actual value input to the controller on line 17 is provided through a switch 14 which in the position shown obtains its input from a sensor 20 sensing the load voltage. In its other position it is coupled to means 15 for setting a fixed reference voltage representing a desired voltage. e.g. a potentiometer. The inverter model 7, in principle, can be built like the power stage 4 of the actual inverter though with correspondingly smaller components. However, since the output voltage of the power stage of the inverter and the firing pulses of its drive unit are in fixed relation, it is possible to construct a simpler inverter model for determining the synthetic actual value voltage.

Figure 2:
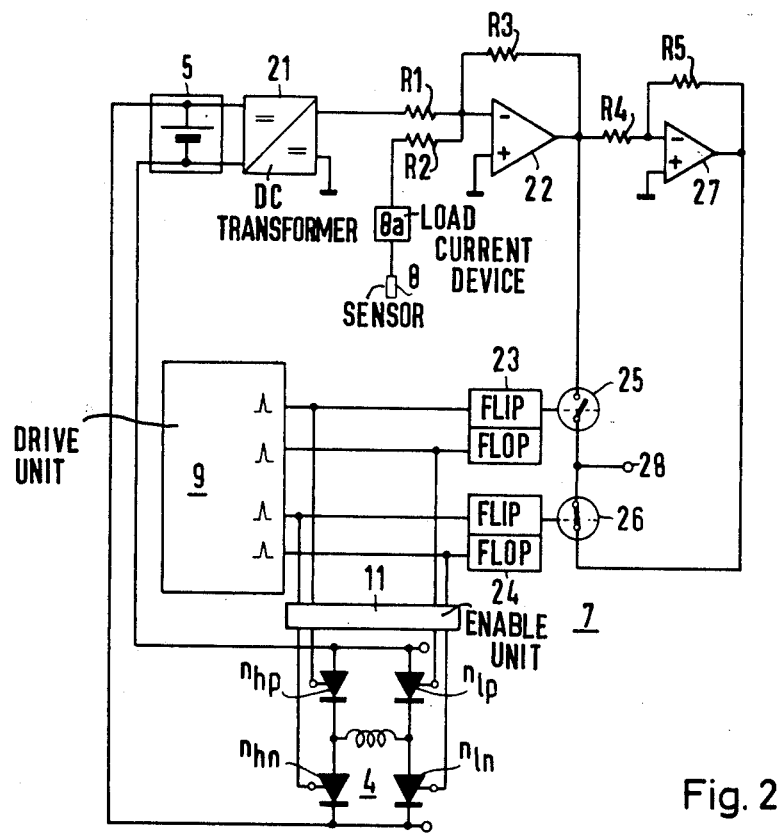
FIG. 2 is a schematic diagram of a circuit for forming a value of the inverter input voltage referred to the load current and of an inverter model for the power supply of FIG. 1.

FIG. 2 is a schematic diagram illustrating such an inverter model for determining a synthetic actual value voltage. Parts which are the same as parts in FIG. 1 are given the same reference numerals. The power stage 4 for forming a single phase a.c. current includes controlled main rectifiers $n_{hp}$ and $n_{hn}$ along with controlled quenching rectifiers $n_{lp}$ and $n_{ln}$ for the positive and negative half-waves of the inverter output voltage. The control inputs of the controlled rectifiers are connected through enabling unit 11 to the firing outputs of the drive unit 9. Connected to the input of the power stage 4 is the d.c. voltage source 5. In this figure, power stage 4 shown only a single phase inverter. This is done to simplify the explanation. In most cases the inverter will be a three-phase inverter and the transition from single phase to three-phase can be accomplished by those skilled in the art without difficulty.

For use as an input variable for the inverter model the d.c. voltage referred to the load current of the power stage of the inverter is required. Since the inverter is inoperative in the standby operation only the no-load voltage of the d.c. voltage source 5 is available as a measured value. However, it is desired to determine, for use as an input variable for the model, the battery voltage which would occur under load. For this purpose, voltage measurement with a d.c. transformer and a summing amplifier 22 is provided. The d.c. transformer 21 transforms the no-load voltage of the battery 5 to a level suitable for further processing and feeds through it a first input resistor R1 to the summing amplifier 22. A second input the summing point at the inverting input of amplifier 22 is provided through resistor R2 from the load current device 8a. In conventional fashion, amplifier 22 has negative feedback through a feedback resistor R3. The load current device 8a may be for example a potentiometer which can be set for an average load current of load. It is also possible to determine and, optinally store the actual load current using a suitable load current sensor 8 such as a current transformer. The ratio of the two input resistors of the summing amplifier corresponds to the voltage drop of the battery which occurs under load. The voltage value of the battery 5, referred to the load current, therefor appears at the output of the summing amplifier 22.

In order to form a voltage value for the d.c. voltage source 5 referred to the load current, it is also possible to use a computer coupled to a multiplexer through an analog-to-digital converter and analog memory. In such a case the inputs of the multiplexer are connected to the measuring sensor 6 for determining the no-load voltage of the d.c. voltage source and to the measuring sensor 8 to determine the actual component of the load current. If necessary, a further measuring transmitter for determining the charge condition of the d.c. voltage source can be used. The computer which in particular will be a programmable micro processor, determines from this input data, in accordance with a predetermined program, the load current-reference voltage value of the d.c. voltage source, which, after ditigal to analog conversion, is available as an analog voltage.

The inverter model of FIG. 2 is suitable for simulating an inverter whose controlled rectifiers are controlled by short pulses. The inverter model 7 contains two flipflops 23 and 24 and switches 25 and 26 controlled by these flipflops. Preferably the switches 25 and 26 will be field effect transistor switches. The flipflops 23 and 24 are each set by the firing pulses for the main rectifiers and reset by the firing pulses for the quenching rectifier of a given polarity of the output voltage of the power stage 4. Thus, the flipflop 23 is set when the drive unit provides a firing pulse for the main rectifier $n_{hp}$. It is reset when the drive unit 11 delivers a firing pulse for the associated quenching rectifier $n_{lp}$. Similarly, the flipflop 24 is set and reset by the firing pulses for the controlled rectifiers $n_{hn}$ and $n_{ln}$, respectively. As a result, the output signal of the flipflop 24 is a logical 1 at the time when the power stage 4 would be generating negative output voltage. Simiarly, the flipflop 23 is a logical 1 state during the time when a positive output voltage is being delivered. Thus, during a positive cycle, flipflop 23 closes the switch 25 to couple the output of amplifier 22 to the output terminal 28. During the negative cycle, an output from amplifier 22 inverted through an inverting amplifier 27 having equal input resistors and feedback resistors R4 is coupled through the switch 26, activated by the flipflop 24 to the output 28. As a result, the load current referenced voltage value of the battery appears at the output terminal 28 with the polarity which the inverter output voltage would have if the transmission of the firing pulses of the drive unit 9 to the controlled rectifiers of the inverter were enableed. The model of the inverter can also be used for inverters whose control rectifiers are controlled by long pulses. In such a case, the flipflop 23 and 24 can be omitted and the switches 25 and 26 controlled directly the long pulses from the drive unit 9.

Figure 3:
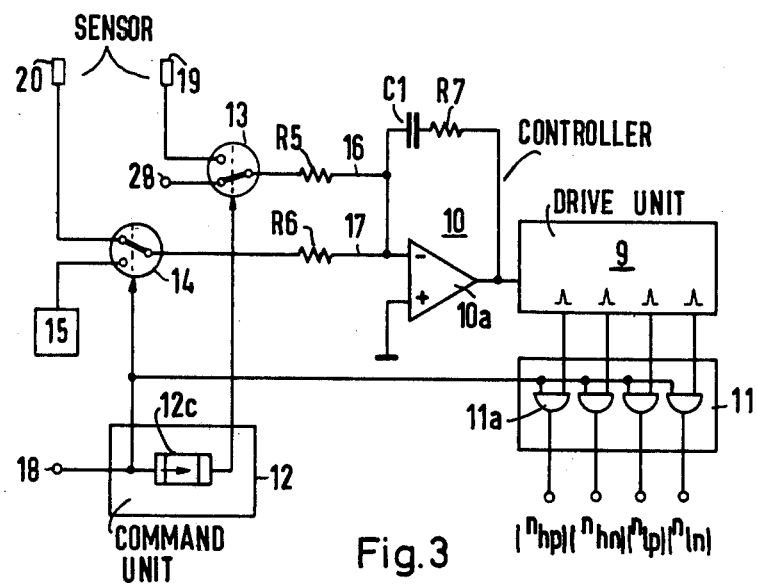
FIG. 3 is a block diagram illustrating the interaction of a command means, a control device and an enabling unit for the power supply of FIG. 1.

FIG. 3 is a schematic diagram illustrating the interaction between the command unit 12, the control device 10, the drive unit 9 and the enabling unit 11. In standby operations, switches 13 and 14 are in the position shown. The control device 10 is illustrated as a proportional integral controller. As illustrated, it includes an amplifier 10a having its inverting input two inputs through input resistors R5 and R6 on lines 16 and 17. To provide the necessary integrating action it contains in its feedback path a capacitor C1 and resistor R7. This is a well know second order control system. The inputs on line 16 and 17 are respectively the control variable or desired value input and the actual value input. In conventional fashion a controller of this nature integrates up and down changing its output until the two input values are equal; in other words, until the actual value equals the desired value. Then, with a zero input, the integrator output remains fixed. In the position shown, the desired value input is obtained from terminal 28 of the inverter model. The actual value is obtained from the sensor 20 sensing the line voltage being supplied to the filter 2 of FIG. 1. The controller 10 acts to control the drive unit 9 in such a manner that the voltage at terminal 28, i.e. the synthetic actual voltage generated by the inverter model, is equal to the load voltage in phase and amplitude. This in turn allows starting the power stage 4 of the inverter at any instant even though the regulating transient of the control device 10 is considerably longer than one period of the inverter output voltage. Upon receipt of a start command at terminal 18, the command unit 12 switches, without delay, a constant reference value voltage from the reference value voltage setting device 15 to the control variable input 16, i.e. the desired value input line in place the measured value of the load voltage and enables, by means of the enabling unit 11 comprised of a plurality of AND gates 11a, the firing pulses of the drive unit 9 to reach the controlled rectifiers in the power stage of inverter. In conventional fashion, the AND gates each have one input coupled to the output of the command unit 12 with their other input coupled to a respective firing output from the drive unit 9. Within the command unit 12 are delay means 12a which, after a predetermined time, provide a second output to switch the switch 13 from the input terminal 28 to the sensor 19 which measures the output voltage of the power stage of the inverter. This input now provides the actual value to the controller 10 and it is caused to control the inverter so as to make the actual value equal the desired value set in on setting means 15. The time delay of the time delay means 12 is selected to the time interval required for a full load takeover by the inverter. Preferably, the enabling unit 12 is placed ahead of the output stages of the drive unit 9 so that signal processing can take place at a low power level.

Figure 4:
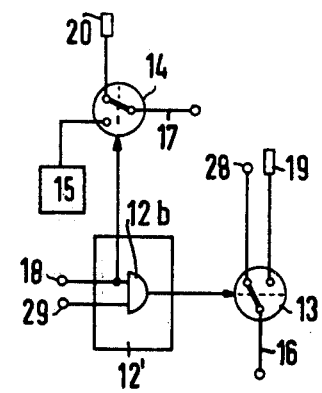
FIG. 4 illustrates another embodiment of command means for the supply of FIG. 1.

FIG. 4 illustrates an alternate embodiment of the command unit 12 designated 12'. Upon receipt of a start command at the terminal 18, this command is immediately supplied to the switch which operates in the manner described above. A second input is provided at terminal 29 coupled to the drive unit 9 and receiving therefrom an acknowledgement that the power stage of the inverter is in operation. Once this occurs an AND gate 12b within the command unit 12' is enable and operates the switch 13 in the manner described above.

Figure 5:
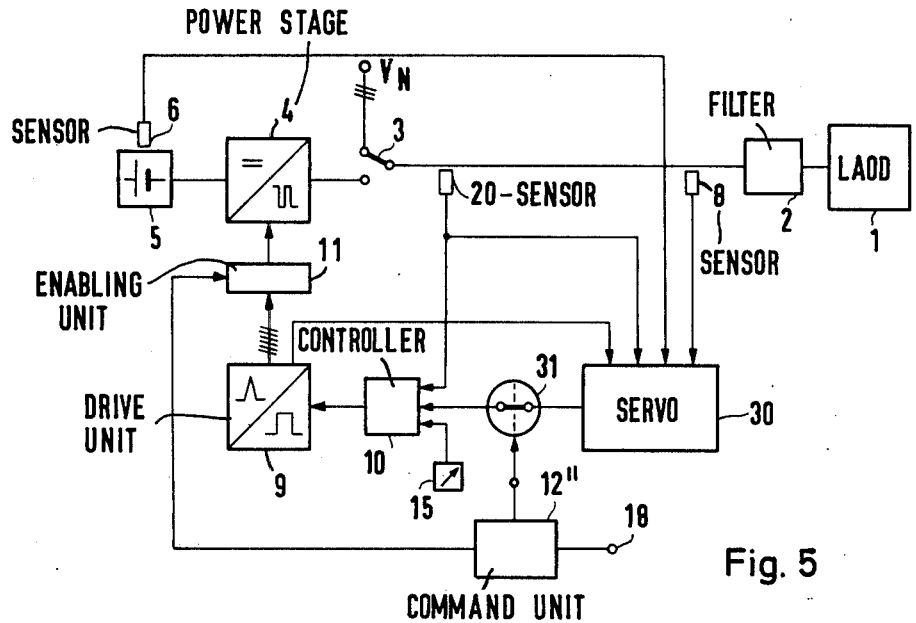
FIG. 5 is a block diagram of an additional embodiment of an interruption-free power supply according to the present invention utilizing a servo arrangement.

FIG. 5 illustrates another embodiment of the present invention. As in the embodiment of FIG. 1, the load 1 is coupled though a filter 2 and switch 3 to the power stage 4 of an inverter. Once again, the enabling unit 11 is interposed between the drive unit 9 and the power stage 4. The d.c. power source 5 is again provided as is a command unit 12''. Once again, the drive unit is controlled by a controller 10.

The device which insures that a control voltage correct for any starting instant is fed to the drive unit during standby operation is in this embodiment a servo arrangement 30. Servo 30 obtains inputs from the sensor 6 measuring the d.c. input voltage, the sensor 8 measuring load current, the sensor 20 measuring load voltage and the signals from the drive unit 9. The sensor 8 preferably measures the active component of load current. The output of the servo arrangment is coupled to one input of the controller 10 through a switch 31, preferably a field effect transistor. The switch 31 is controlled by the command unit 12''. Once again, an actual value setting means 15 are provided. The controller has as a further input the output of sensor 20.

In standby operation the double throw switch 3 and electronic switch 31 are in the position shown. The load is supplied with the line voltage $V_n$ through the filter 2 and the switch 3. The servo arrangement using the signals of the drive unit 9 and the measured values determines the correction voltage which is fed to the control device 10 along with the measured value of the load voltage from the sensor 20 and the reference voltage from the reference setting device 15.

In case a deviation outside required limits of failure of a line voltage $V_n$ occurs, the double throw switching device is switched by a monitorying device, not shown, and a starting command supplied at the input terminal 18 of the command unit 12. The command unit 12 then enables the firing pulses of the drive unit 9 to reach the controlled rectifiers in the power stage of the inverter by enabling gates in the enabling unit 11 and switches the electronic switches the electronic switch 31 to cut off. The correction voltage of servo arrangement 30 is thus disconnected from the input of the control device 10.

Figure 6:
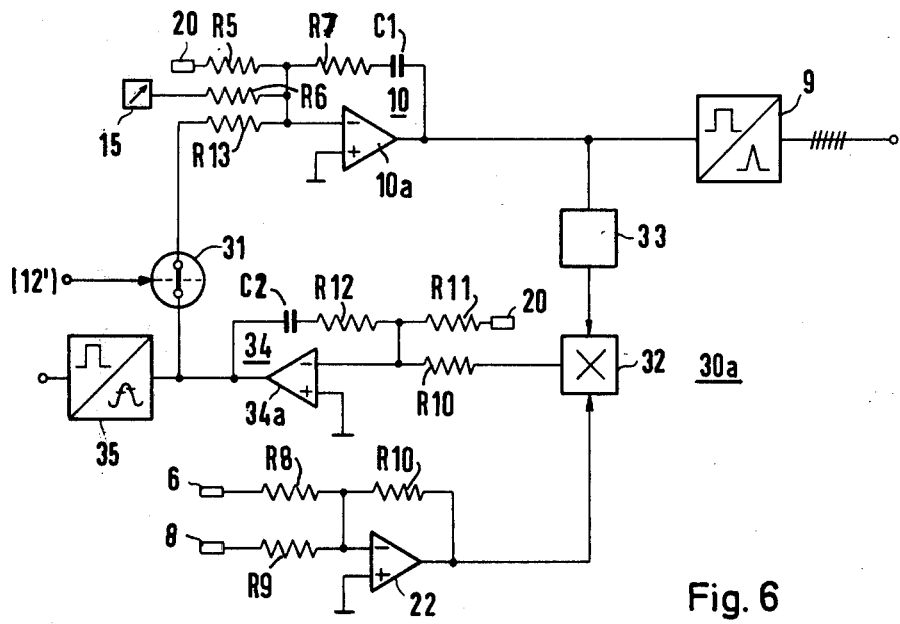
FIGS. 6, 7, 8 and 9 are circuit diagrams illustrating various servo arrangements which can be used for the power supply of FIG. 5.

FIG. 6 is a schemantic diagram illustrating a typical amplitude servo follow-up device 30a which can be used as the device 30 of FIG. 5. Included is a summing amplifier 22 having input resistors R8 and R9 coupled to its inverting input with negative feedback through a resistor R10. Resistors R8 and R9 are coupled respectively to the sensors 6 and 8 sensing the d.c. input voltage and load current respectively. This amplifier develops the same value described above in connection with the amplifier 22 of FIG. 2. In other words, it provides a load current referenced input voltage. Again, the ratio of the two input resistors is chosen according to the voltage drop of the battery which occurs under laod. As previously described, this output can also be developed using a micro processor. This load current referenced voltage from the summing amplifier 22 and the output of a function generator 23 are fed to a multiplier 32. The function generator 33 is arranged to simulate the control characteristic of the inverter which describes the actual relationship between the inverter output voltage and the input voltage of the drive unit, taking all non-linearities into consideration. The output signal of the multiplier 32 represents a value of the inverter output voltage computed in the analog computing circuit made up of the members 22, 32 and 33. If a micro processor is used to determine the voltage of the battery referred to the load current, it is advisable to take the control characteristics into account in programming the computer thereby permitting elimination of function generator 33 and multiplier 32. The output of the multiplier 32, i.e. the computed value of the inverter output voltage is compared in a correcting control 34 with the measured load voltage supplied by the measuring sensor 20. Correcting control 34 includes amplifier 34a having the output of multiplier 32 coupled through an input resistor R10 to its inverting input and also having coupled to the same terminal through a resistor R11 the measured load voltage. To obtain a proportional integral control, the capacitor C2 and resistor R12 are provided in the feedback path. The output of the amplifier 34a is a correction voltage proportional to the difference between the inputs at the resistors R10 and R11. This correction voltage is coupled through the switch 31 and through an additional input resistor R13 as an input to the controller 10 which will be basically as described in connection with FIG. 3 except that the resistor R5 is now directly coupled to the sensor 20 and resistor R6 directly coupled to the setting means 15. This correction signal fed back to the control device 10 will act through the function generator 33 to cause the difference between two inputs to approach zero and the correction term likewise to reach zero. When a startup command is received, switch 31 is opened and the correction term no long present. Operation then proceeds in the manner described above.

The operation of FIG. 6 can be explained further by means of an arbitrary numerical example. Assume that the desired value of the load voltage is 220 volts and the actual value of the load voltage approximately 222 volts. If the servo follow-up arrangement did not exist, the control device would be driven by the difference by 2 volts present at its input. Since the control device 10 includes an integrating component it would continue to integrate upwardly until it reached its saturation voltage. As a result, the drive unit 9 would have as an input a voltage much too large. If the firing pulses of the drive unit, overdriven in this manner, were enabled and coupled to the controlled rectifiers in the power stage of the inverter, it would generate too high an output voltage. However, according to the present invention, this is avoided by computing a value for the inverter output voltage calculated in the servo follow-up arrangement and compared in the correcting control 34 with the load voltage. Thus, if there is a deviation the correcting control forms a correction voltage of, for example, 2 volts which is connected to the control device 10 at its input. The output voltage in the control device 10 thus remains at the value which is necessary for the input voltage for the drive unit 9 in order to control the controlled rectifiers in the power stage of the inverter to the required correct inverter output voltage if the firing pulses are enabled. In addition, the correction voltage from the correcting control 34 is an input to a limit detector 35 which provides at its output a fault signal if a predetermined limit is exceeded. Through the use of this fault signal, trouble in the control device 10, the servo follow-up arrangement 30 and the drive unit 9 can be detected.

Figure 7:
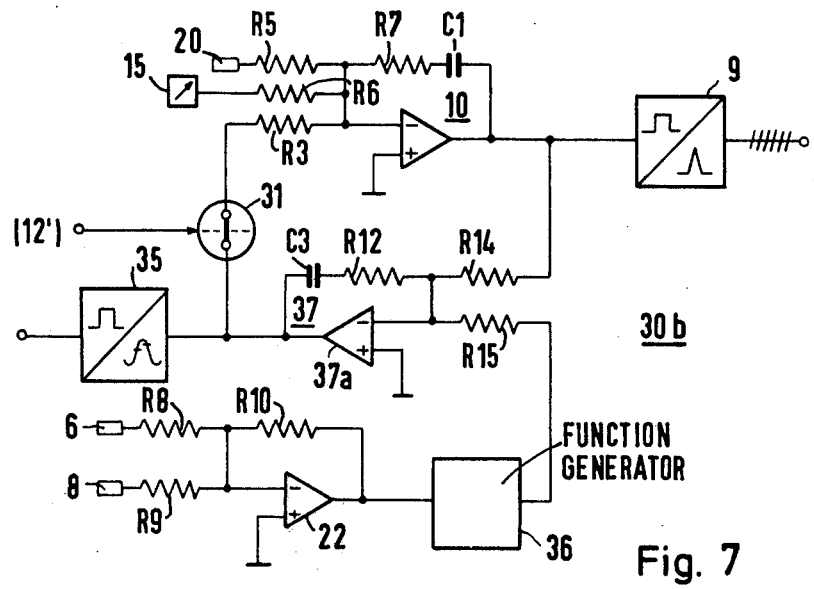

FIG. 7 illustrates a further possible embodiment for the servo follow-up arrangement designated 30b. It includes a summing amplifier 22 operating in the manner described above to form a reference input voltage which is referenced to the load current of the inverter. This is coupled through a function generator 36 which inversely simulates the portion of the characteristic of the control system between the control voltage input of the drive unit 9 and the load input for constant inverter output voltage. The output of function generator 36 represents a calculated control voltage for the drive unit. A correcting control 37 is provided including a amplifier 37a having input resistors R14 and R15 and a feedback resistor R12 in series with a feedback capacitor C3. One input resistor, R15, is coupled to the output of the function generator 36 and other input resistor, R14, coupled to the output of the controller 10. In the unit 37 the computed value from the function generator 36 is compared with the actual value from the controller 10 and a correction signal output and fed back through the resistor R13 to the controller through the electronic switch 31 in the manner described above.

Figure 8:
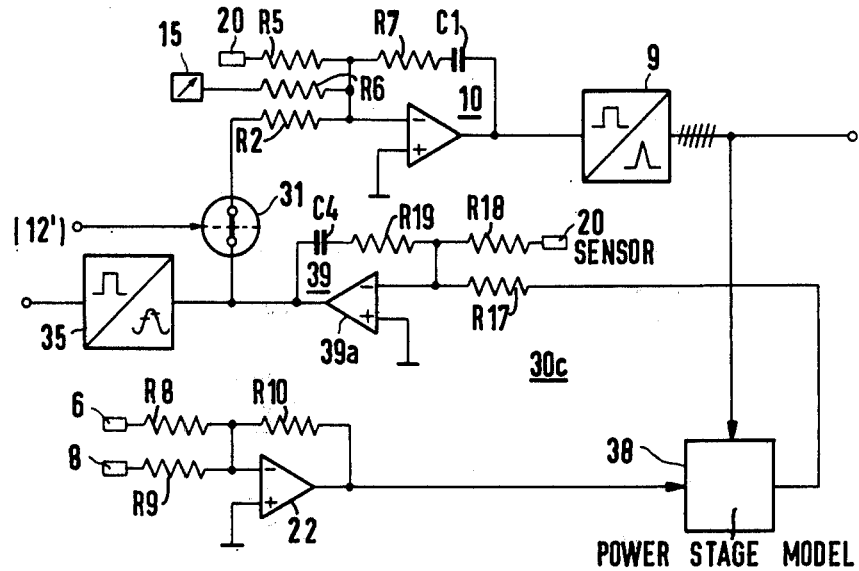

Another possible embodiment of the amplitude follow-up arrangement designated 30c is shown on FIG. 8. Again, the controller 10 and the input for developing the load current referenced value of the input voltage are as before. In this embodiment, the output of the amplifier 22 is provided to a power stage model 38 which is continuously acted upon by firing pulses of the drive unit 9 for the controlled rectifiers of the inverter. Once again the output voltage of the power stage model 38 represents a calculated value of the output voltage of the inverter. This output voltage is once again compared in an arrangement 39 made up of amplifier 39a having input resistors R17 and R18 with a feedback resistor R19 and feedback capacitor C4. Here the output of the power stage model is compared with the actual load voltage obtained by the sensor 20. Thus, again a correction voltage is developed which is applied through the switch 31 as an input to the control device 10.

The power stage model 38 can, in principle, be built by the power stage 4 of the inverter but with components of correspondingly smaller size. However, since the output voltage of the inverter has a fixed relationship to the firing of its drive units, an electronic simulation of the power stage can be constructed in the manner described in connection with FIG. 2.

Figure 9:
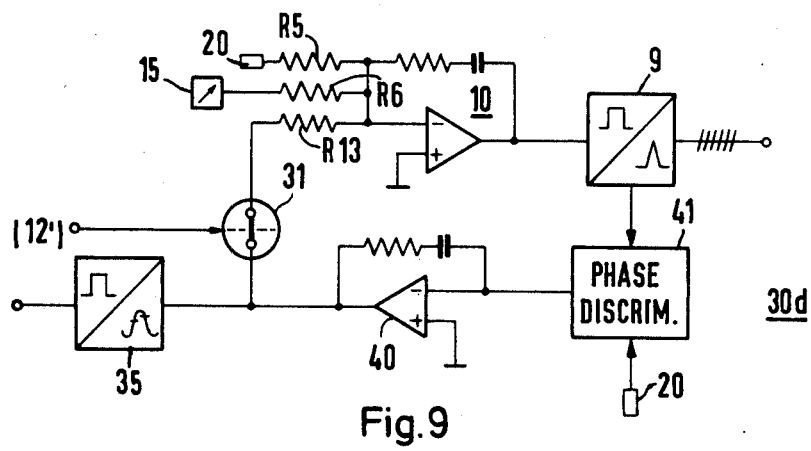

FIG. 9 illustrates an arrangement designated 30d which can be used as the servo means 30 of FIG. 5. This is a phase follow-up arrangement used as a synchronizing device for an inverter whose rectifiers are not addressed in stand-by operation. Included is a phase discriminator 41 having as inputs a phase reference value derived from the load voltage determined by the measuring sensor 20 and the phase signal of the drive unit 9. The phase signal is an internal signal in the drive unit and can be derived directly from the firing pulses in a manner similar to that illustrated in FIG. 2. The phase discriminator 41, in conventional fashion, forms a phase difference which is converted in a correcting control 40 into a correction voltage and applied through the electronic switch 31 of the control device 10 to its input resistor R13.

Figure 10:
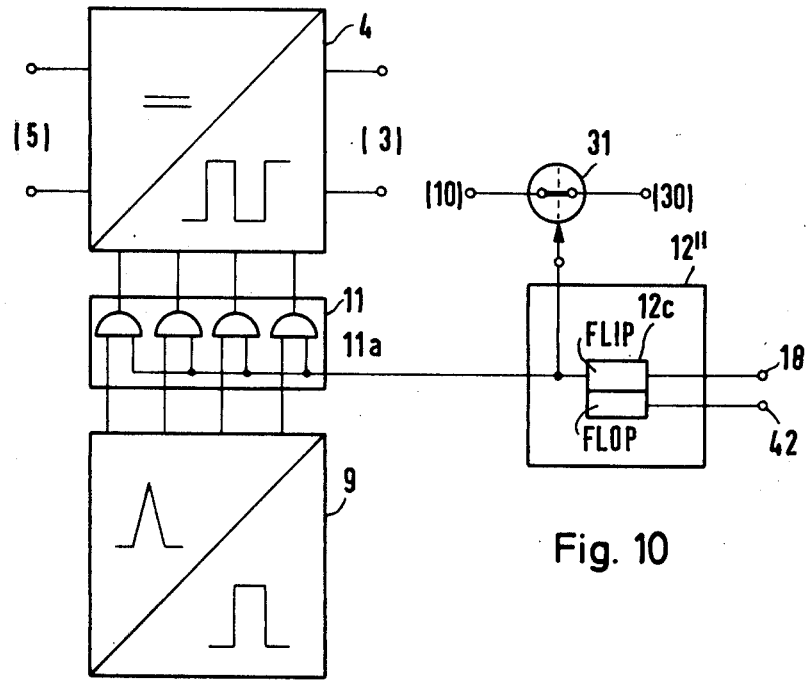
FIG. 10 is a block diagram illustrating the interaction of a command unit, an enabling unit and an electronic switch for the power supply of FIG. 5.

FIG. 10 illustrates the interaction of the command unit 12″ of FIG. 5 with the switch 31 and the enabling unit 11. As described previously, the enabling unit 11 includes a plurality of AND gates 11a having an enabling input from the command unit 12″ with their other respective inputs obtained from the drive unit 9. Within the control unit 12″ is a storage device such as a flip-flop 12c. Upon the start command at terminal 18, the flip-flop is set providing outputs both to enable the gates 11a and to open the switch 31 to dis-connect the correction input. The flip-flop 12c is reset by a reset input at terminal 42. Such command can be provided when the installation is switched on prior to connecting the dc voltage source 5.

Figure 11:
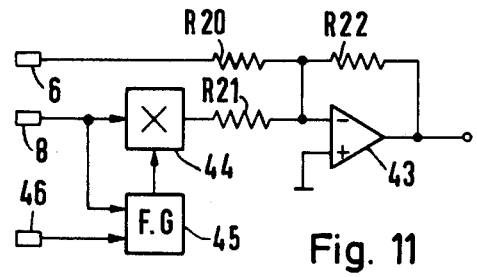
FIG. 11 is a schematic diagram illustrating a circuit for forming a value of an inverter input voltage referred to the load current.

FIG. 11 illustrates a circuit for determining a more exact value of the dc source voltage referred to the load current. In this arrangement, a summing amplifier 43 has coupled to its inverter input with resistor, R20 the output of the sensor 6 sensing the battery voltage. The output of the current sensor 8 is coupled as one input to a multiplier 44 and as an input to a function generator 45. The output of the multiplier is coupled through a second resistor R21 to the input of amplifier 43. In conventional fashion, a feedback resistor R22 is provided. The function generator simulates the internal resistance of the battery with respect to load current, particularly the active component of the load current obtained from the measuring sensor 8. It has as its second input a quantity which depends on the charge condition of the battery. To determine this its acid density or its rest potential is measured using an additional measuring sensor 46. The quantity dependent on the charge condition of the battery is then multiplied in the multiplier 44 by the load current. The multiplier 44 thereby provides an output representing a quantity which simulates the voltage drop of the battery under load.

Figure 12:
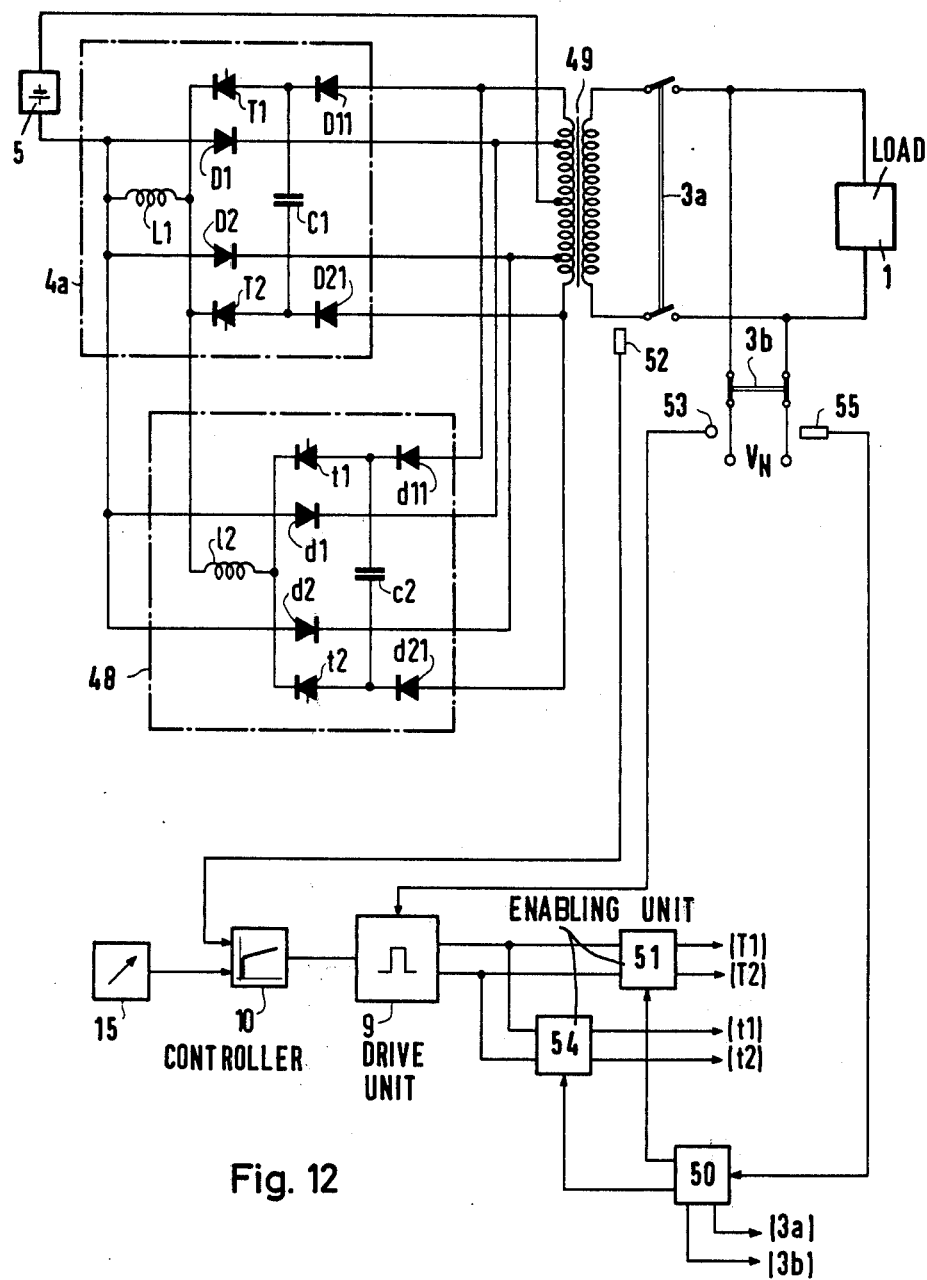
FIG. 12 illustrates a further embodiment of the present invention utilizing an auxiliary inverter.

FIG. 12 illustrates another embodiment of the invention utilizing an auxiliary inverter 48 of small power rating to enable the drive unit 9 to have a correct output for any desired starting voltage. Both the power stage 4a of the main inverter and the auxiliary inverter 48 are supplied by the dc voltage source 5. In addition, both are coupled to the primary of the output transformer 49. The output of the drive unit 9 is coupled through a first enabling unit 51 to the controlled rectifiers T1 and T2 of the power stage 4a and through an enabling unit 54 to the controlled rectifiers $t1$ and $t2$ of the auxiliary converter 48. Both enabling units are controlled by a command unit 50 which also provides outputs to switches 3a, 3b.

The power stage 4a of the power inverter is constructed in well known manner in the form of a center-tap bridge circuit with the arms of the bridge including the main rectifiers T1 and T2 and seried diodes D11 and D21. In addition, bypass diodes D1 and D2 are provided. A commutation capacitor C1 and a commutation inductance L1 are used to form a commutation circuit. The dc inputs of the power stage 4 are coupled to the dc voltage source 5 which may be a battery. The outputs of power stage 4 are coupled in well known manner to the transformer 49 whose secondary windings can be coupled through the switch 3a to the load 1. In normal operation, the load 1 is supplied through the switch 3b with the ac line voltage $V_N$ when the line voltage $U_N$ suffers an excessive dip or failure, contacts 3b are open by the command unit 50 and contacts 3a closed. The load is then supplied from the dc voltage source through the power converter 4a.

The auxiliary inverter 48 is of considerably smaller power rating and contains controlled main rectifiers $t1$ and $t2$ with series diodes $d11$ and $d21$ along with bypass diodes $d1$ and $d2$. It has a commutation circuit formed by a commutation capacitor $c2$ and commutation inductance 12. In other words, the auxiliary inverter 48 is an exact duplicate of the power inverter 4a except that its components are of considerably smaller size.

For some special applications it may be advantageous to design the auxiliary inverter 48 with enough power capacity for emergency operation of the load 1. For certain consumers this may result in avoiding heavy damage which could occur if the power supply fails completely. An example of such an installation is one used for data processing in which stored information can be lost if complete power supply failure occurs. In such a case, the power of the auxiliary converter 48 can be used to supply the necessary holding current for the information storage.

As with the previous embodiments, control of the inverters is by means of a drive unit 9 preceded by a control device 10. The controller 10 will be essentially the same as those described above and is in the form of a voltage regulator having as an actual value output the output voltage transformer 49 as sensed by a measuring sensor 52. Its reference voltage input is the output voltage of a reference voltage setting means 15. As noted, control device will be of the type above, i.e. it will be a proportional integral control and generates a control voltage for a drive unit 9 which is synchronized in well known manner with the line voltage $U_N$ using a synchronizing tap 53. The firing pulses generated by the drive unit 9 are coupled through an enabling unit 51 to the control rectifiers T1 and T2 of the power stage 4 and through a unit 54 to the control rectifiers $t1$ and $t2$ of the auxiliary inverter 48. Both units 51 and 54 are controlled by the command unit 50 which has an input coupled to a measuring sensor 55 for monitoring the line voltage $U_N$.

The position of the switch contacts 3a and 3b of the switching device as shown in the drawing are for normal operation with the load 1 supplied from the power line system. In this condition, transmission of firing pulses of the drive unit 9 to the controlled rectifier T1 and T2 of the power stage 4a is blocked by the enabling unit 51. Firing pulses from the drive unit 9 to the controlled rectifiers $t1$ and $t2$ of the auxiliary inverter are coupled through the unit 54, which is enabled. In this condition, the auxiliary inverter operates and supplies an output voltage which is measured by the measuring sensor 52 and is fed to the control device 10 in well known manner. The commutation capacitor $c2$ is charged and then charge reversed by the inverter output voltage. Inductances L1 and 12 in series are effective as the commutation inductance.

Since the power stage 4 does not operate in stand by operation, no losses are produced by its components. The auxiliary inverter 48 does operate and generates an output voltage at the transformer 49 which is fed by the control device 10. The control device 10, thus, operates in its normal manner during stand-by operation. It is important that the smaller auxiliary inverter be operated using the same control method or pulse method of the power inverter 4a. This ensures that in the stand-by position the output voltage of the transformer will have the same waveshape and the same values as in power operation so that the control loop is always closed.

Since the smaller auxiliary inverter only is running during stand-by operation, considerably smaller losses and less noise are produced in its components than with a power inverter operating at no-load. Furthermore, it is possible to monitor important parts of the power inverter continuously, e.g. to monitor the dc voltage source 15 and its leads, along with the drive unit and control device. Upon a starting command for the power inverter, no switching of any kind is necessary in the control device. The transformer 49 is always magnetized and need not be designed for transients.

If the line voltage fails or is interrupted or disturbed to a degree not permissible, this is detected by the measuring sensor 55 and causes the command unit 50 to close switch 3a and open switch 3b. At the same time, the command unit enables enabling unit 51 to transmit firing pulses to the controlled rectifiers T1 and T2 in the main power stage 4a. The firing pulses to the controlled rectifiers $t1$ and $t2$ of the auxiliary inverter 48 are cut-off by disabling the unit 54. This latter step can be omitted if the auxiliary inverter is also to be used during power operations. In addition, firing pulses to the rectifiers $t1$ and $t2$ can optionally be enabled in accordance with a predetermined enabling program.

It shoud be noted that the power inverter and auxiliary inverter shown are shown only by way of example. Any desired inverter circuit can be used with the present invention. In particular, it should be noted that in most applications a mutliphase inverter will be used.

Figure 13:
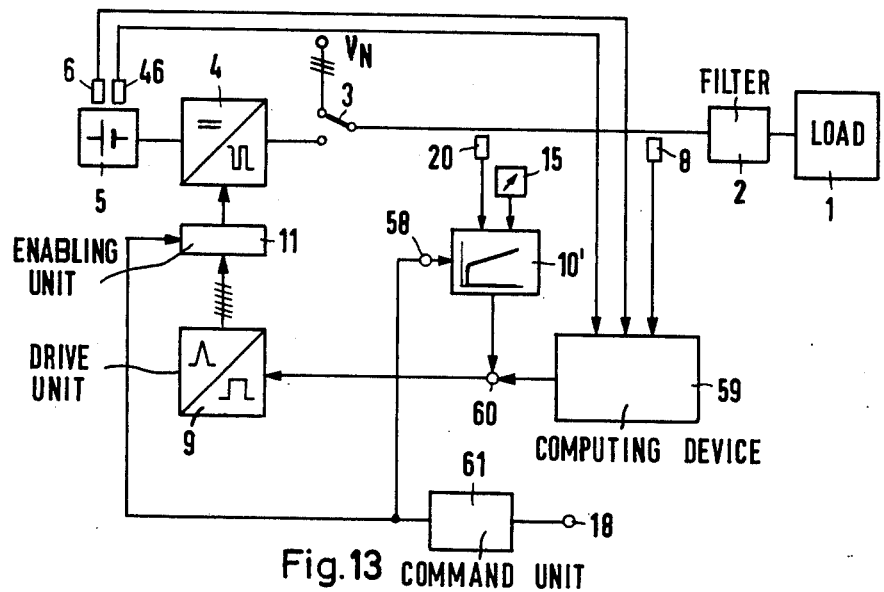
FIG. 13 is a similar diagram illustrating an embodiment of the present invention using a computing device.

FIG. 13 illustrates a further embodiment of the present invention. In this embodiment, a switching device which disables control device 10' in stand-by operation and a continuously running computing device 59 and summing means 60 are provided. Inputs in the computing device 59 are coupled to a measuring sensor 6 measuring the no-load voltage of the battery 5, the measuring sensor 8 measuring the active component of the load current and the measuring sensor 47 for determining the charge condition of the battery 5. The control device 10' has as its input the measuring sensor 20 measuring the load voltage and a reference voltage setting device 15. The summing means 60 which can comprise a conventional summing amplifier have as inputs the output of the controller 10' and the computing device 59. The command unit 61 is provided having an input 18 which is fed by a starting command and providing outputs to the enabling unit 11 and to an additional input terminal 58 of the control device 10'.

Command unit 61 may be of the type disclosed in connection with FIG. 10.

In normal operation, the switch 3 couples the load 1, through the filter 2 to the line voltage $V_N$ from the power network. With respect to FIG. 14, it will be noted that the input on terminal 58 to the controller 10' closes the switch 57, preferably a field effect transistor switch, to maintain the output of the amplifier at zero. The remainder of the controller 10' is as described above including the resistors R5 and R6 at its input, feedback resistor R7 and feedback capacitor C1. Under these conditions, the output of the computing device 59 is used as the input to the drive unit 9 through the summing means 60. Summing means 60 are shown in more detail on FIG. 14 and include input resistors R31 coupled to the controller 10', R33 coupled to the computing device 59 and a feedback resistor R35 about an amplifier 60a. Should a failure occur in the line voltage, the switching device 3 is switched by a monitoring device, not shown, and a starting command is given to the input terminal 18 of the command unit 61. In response thereto it provides an output to the terminal 58 to open the switch 57 and another output to enable the enabling unit 11 to transmit pulses from the drive unit to the power stage 4. The inverter 4 immediately begins an operation. Control device 10' begins in operation and forms a correction voltage which is added with proper polarity at the summing means 60 to the computed control voltage from the computing device 59.

Figure 14:
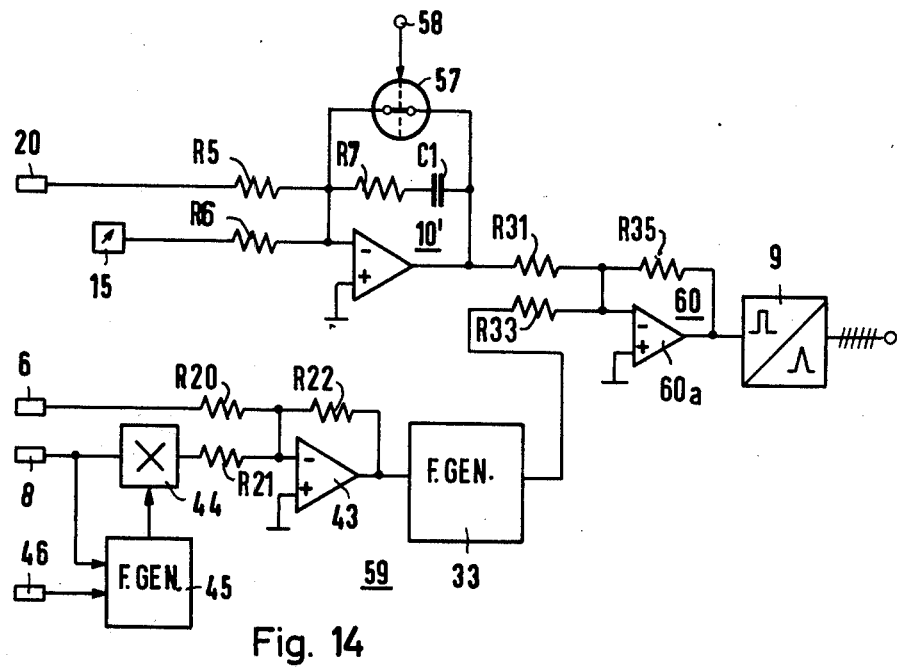
FIG. 14 is a schematic diagram of a computing device which can be used in the embodiment of FIG. 13.

In addition to showing the construction of the control device 10' FIG. 14 also illustrates the computing device 59. In order to determine a load current referenced battery voltage, a summing amplifier 43 essentially identical to that shown in FIG. 11 is used. As explained below, it has its input the output of the measuring sensor 6 of the no-load voltage of the battery and the output of a multiplier having as input the output of the measuring sensor 8 and the output of a function generator 45 obtaining its inputs from measuring sensor 8 and measuring sensor 46 representing the charge condition of the battery. In the summing amplifier 43, the voltage drop under load is substracted from the no-load voltage of the battery so that the output signal of the summing amplifier 43 represents the voltage value of the battery, referenced to the load current, which in power operation will be the input voltage for the inverter. This output voltage is provided through a function generator 33 which simulates the control characteristics of the inverter. The control characteristic is the actual relationship between the inverter output voltage and the input voltage of the drive unit, taking all non-linearities into consideration. The output of signal function generator 33 represents the computed control voltage for the control unit 7.

In stand-by operation, control voltage for the drive unit is not formed by the control device 10' but by the computing device 59. In this manner a largely correct control voltage for the drive unit is already available at the instant of the starting command. This is particularly important for quick starting since the transient of a conventional control arrangement is several times the period of the inverter output voltage in order to maintain good control dynamics. As in the stand-by operation, a control voltage which is basically correct is always fed to the drive unit, the control rectifiers of the power stage inverter can be enabled immediately upon a starting command. Simultaneously with the starting command, the control device 10' is enabled. In power operation of the inverter 4, the control device supplies a correction value which is added with the proper polarity in the summing member 60 to the computed control voltage. Thus, the sum of the computed control voltage from the computing device 59 and the correction voltage obtained from the control device 10' form the input to the drive unit 9 during power operation. If the computing device 59 isn't working properly, the control device 10' will supply only a small correction voltage to match the actual value of the load voltage to the predetermined reference value, i.e. the desired value.

Figure 15:
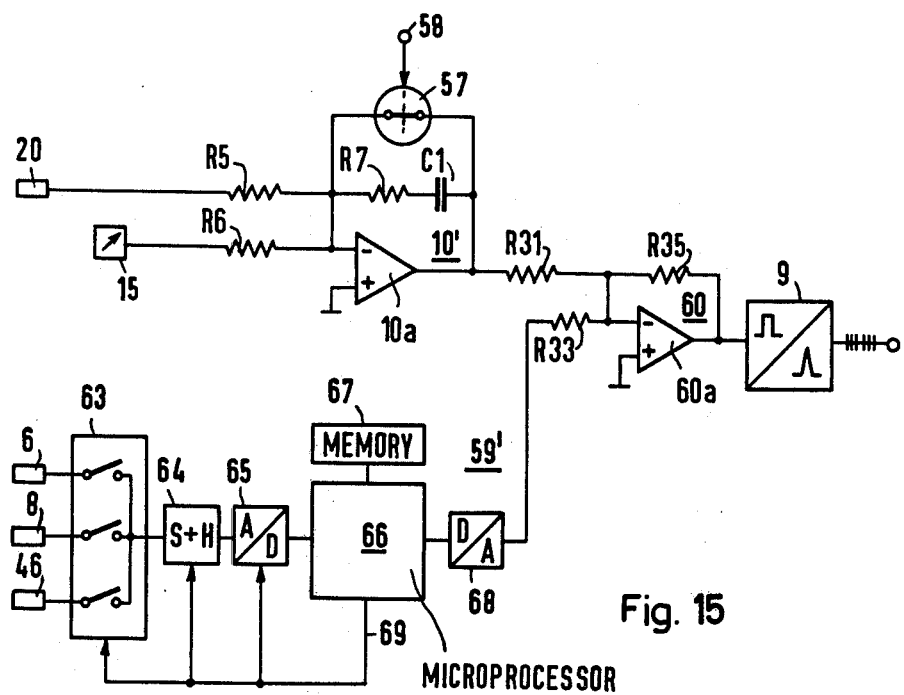
FIG. 15 illustrates an alternate computing device for use in the arrangement of FIG. 13.

FIG. 15 illustrates an alternate computing device 59' which may be used in the circuit of FIG. 13. For this purpose, a computer 66 preferably a microprocessor, has at its inputs measuring sensor 6 for determining the no-load voltage of the battery, the measuring sensor 8 for determining the active component of the load current and the measuring sensor 46 for determining the charge condition of the battery. These are coupled through a multiplexer switch 63 to an analog storage device 64 such as a sample and hold circuit the output of which is coupled to a digital analog converter supplying its input to the micro processor 66. An output on line 69 therefrom controls the multiplexing switch in conventional fashion. Associated with the microprocessor is a memory 67 in which is stored the program for carrying out the computer process. In essence, this program simply duplicates the computation which is done in analog fashion in the analog circuit of FIG. 14. In other words, it calculates a load current referenced voltage value for the battery and subtracts therefrom the voltage dropped under load as was done with the analog circuits in FIG. 14. The result is provided to a digital to analog converter 68 which provides its output to the input resistor 33 at the summing means 60. The operation of the remainder of the circuit is exactly as described in connection with FIG. 14. The use of a micro processor, which can be also used in the other illustrated embodiments to take the place of analog computing circuits, permits adapting circuits of the present invention to different applications without exchanging or adjusting components. All that is required are simple program changes.

The above described embodiments of the present invention permit extremely fast starting of the power stage of the inverter even though the regulating transient of the control device is longer than the time of one period of the voltage and is typically up to one second. It should also be noted that rather than using a battery as a dc voltage source, other suitable current sources may be used, such as fuel cells. Furthermore, the inverter of the present invention can be used not only to supply interruption-free power but may also be used, for example for supplying load peaks in the power supply system.

These and other modifications may be made without departing from the spirit of the invention which is intended to be limited solely by the appended claims.

What is claimed is:

1. In an inverter supplied with an input voltage and having a power stage including controlled rectifiers controlled by a control unit containing a drive unit and a control device in the form of an integral controller, the drive unit providing output firing pulses for the controlled rectifiers whose firing angle is dependent on a control voltage developed by the integral controller, said inverter being a stand-by controller for taking over a load in the case of an emergency, means for permitting rapid start up of the power stage such that it immediately provides a full output voltage without delay comprising:

a. an enabling unit interposed between the drive unit and power stage which is capable of selectively enabling or blocking the transmission of firing pulses in response to a control input;
b. means for developing and supplying to the control unit a control voltage which is such as to result in a correct voltage at the output of the inverter with the load which it must take over for any starting instant; and
c. a command unit having an input for receiving a starting command and providing an output to the control input of said enabling unit to enable it to transmit firing pulses from said drive unit to the controlled rectifiers of said power stage.

2. Apparatus according to claim 1 wherein the input voltage supplied to said inverter is one which is subject to a voltage drop when said inverter is supplying a load and wherein said means for developing and supplying include means for developing a voltage value representing the inverter input voltage under load.

3. Apparatus according to claim 2 wherein said means for developing said correct control voltage comprise:

a. an inverter model having inputs coupled to said control unit and including said means for generating a voltage value, said inverter model operative during stand-by operation and providing at its output a synthetic actual value voltage;
b. a double throw switch having a control input coupled to said command unit coupling the output of said inverter model to a control variable input of said control device when in one position;
c. means for measuring the actual value of the inverter output voltage, said means providing an input to said double throw switch which will be coupled to said control device when said switch is in said other position, said command unit controlling said switch from the first to the second position when said inverter is started.

4. Apparatus according to claim 2 and further including means to supply said control device with a constant reference voltage in its control variable input.

5. Apparatus according to claim 3 further including means for measuring the actual value of load voltage, means for setting a constant reference voltage as a desired value of load voltage and switching means for selectively coupling the control variable input of said control device to means for measuring and said means for setting, said switching means responsive to said command unit to couple said measured value of load voltage in the absence of a starting command and to couple said constant reference voltage upon receipt of the starting command.

6. Apparatus according to claim 3 wherein said inverter model comprises for each phase of the inverter:

a. a first flip-flop having its set input coupled to the firing pulse output for the controlled main rectifier in the inverter and its reset input coupled to the firing pulse output for the controlled quenching rectifier in the inverter associated with the positive cycle;
b. a second flip-flop having set and reset inputs coupled respectively to the firing pulse outputs for the controlled main rectifier and controlled quenching rectifier for the negative portion of the cycle; and
c. switching means having the outputs of the first and second flip-flops as control inputs for coupling said voltage value representing the inverter input voltage to an output with a polarity corresponding to the polarity of the inverter output voltage.

7. Apparatus according to claim 2 wherein said means for forming said input voltage value comprises means for forming an input voltage which is referenced to the load current comprising a summing amplifier having as inputs the measured value of no load voltage of the dc voltage source provided through a first input resistor and a voltage simulating the voltage drop of the dc voltage source under no load providing a second input.

8. Apparatus according to claim 7 wherein said voltage simulating the voltage drop of the dc voltage source under load is a measured voltage proportional to the active component of load current.

9. Apparatus according to claim 7 and further including a function generator having a function simulating the internal resistance of the battery as the function of its charge condition and the load current having as inputs voltages representing the load current and the degree of battery change and the multiplier having as inputs the output of said function generator and said voltage representing the active component of the load current, the output of said multiplier providing said voltage simulating the voltage drop of the battery.

10. An inverter according to claim 2 wherein said means for determining the input voltage of the inverter referenced to the load current comprises digital computing means, a multiplexer controlled by an output from said digital computing means having as input quantity representing the active component of the load current and the no load voltage of the dc voltage source, a sample and hold circuit having its data input coupled to the output of said multiplexer and having a sample input coupled to said computing means; and analog digital converter having its input coupled to the output of said sample and hold circuit and providing its output to said computing means; a digital to analog converter coupled to the output of said computing means and having its output coupled to said control device.

11. An inverter according to claim 1 wherein said means for developing comprise an additional auxiliary inverter of smaller power rating having its dc inputs coupled to the same dc voltage source as said power inverter and its ac voltage outputs connected in parallel to the ac voltage outputs of said power stage, said power stage including an output transformer to which both inverters are coupled, said power inverter and auxiliary inverter both being controlled by a single control device with a drive unit, a further enabling unit coupling the firing output of said drive unit to said auxiliary inverter and wherein said command unit is arranged to control both said enabling units.

12. Apparatus according to claim 11 wherein said auxiliary inverter has a power rating permitting it to be used for emergency supply of the load associated with the power inverter.

13. Apparatus according to claim 1 wherein said means for developing comprise a servo follow-up arrangement, said arrangement having as inputs at least one of the load voltage in load current the value of the inverter input voltage and a signal from the control unit and developing at its output a correction voltage, electronic switching means having a control input coupled to said command unit and coupling the output of said servo follow-up arrangement to said control device, said control device having as additional inputs the measured value of the inverter output voltage, said electronic switching means being responsive to said command unit to disconnect said correction input upon a starting command.

14. Apparatus according to claim 13 wherein said servo follow-up arrangement includes first means for developing a voltage representing the inverter input voltage.

15. Apparatus according to claim 14 wherein said servo follow-up arrangement comprises an amplitude servo follow-arrangement comprising:
 a. second means having an input coupled to the control device and providing an output simulating the control characteristics of the inverter;
 b. a multiplier having as inputs the outputs of said first and second means;
 c. third means for generating a voltage representing the load voltage;
 d. fourth means for forming a correction voltage having as inputs the output of said multiplier and said third means, the output of said fourth means being coupled through said electronic switching device to said control device.

16. Apparatus according to claim 14 wherein said means for forming said input voltage value comprises means for forming an input voltage which is referenced to the load current comprising a summing amplifier having as inputs the measured value of no load voltage of the dc voltage source provided through a first input resistor and a voltage simulating the voltage drop of the dc voltage source under no load providing a second input.

17. Apparatus according to claim 16 wherein said voltage simulating the voltage drop of the dc voltage source under load is a measured voltage proportional to the active component of load current.

18. Apparatus according to claim 16 and further including a function generator having a funttion simulating the internal resistance of the battery as the function of its charge condition and the load current having as inputs voltages representing the load current and the degree of battery charge and the multiplier having as inputs the output of said function generator and said voltage representing the active component of the load current, the output of said multiplier providing said voltage simulating the voltage drop of the battery.

19. An inverter according to claim 14 wherein said means for determining the input voltage of the inverter referenced to the load current comprises digital computing means, a multiplexer controlled by an output from said digital computing means having as input quantity representing the active component of the load current and the no load voltage of the dc voltage source, a sample and hold circuit having its data input coupled to the output of said multiplexer and having a sample input coupled to said computing means; an analog digital converter having its input coupled to the output of said sample and hold circuit and providing its output to said computing means; a digital to analog converter coupled to the output of said computing means and having its output coupled to said control device.

20. Apparatus according to claim 14 wherein said servo arrangement is a phase follow-up servo arrangement comprising
 a. a phase discriminator having as inputs an output of said drive unit representing the phase of the output voltage and a voltage representing the actual load voltage and developing an output representative of the difference in phase between said two inputs; and
 b. means having the output of said phase discriminator as an input for developing a correction signal, the output of said means being provided through said electronic switch as an input to said control device.

21. An inverter according to claim 13 and further including a limit detector coupled to the input to said electronic switching means and providing an output if the voltage at said point exceeds predetermined values.

22. Apparatus according to claim 2 wherein said control device has as inputs the sensed load current and a desired value of load current and said means for developing comprise:
 a. means for computing a control signal for said drive unit having as inputs a measured active component of the load current and the measured input voltage of the inverter and including said means for computing an input voltage value;
 b. summing means having as inputs the output of said means for computing and the output of said control device, the output of said summing means being provided as the control input to said drive means; and
 c. means coupled to said command unit for maintaining the output of said control device at zero in the absence of a starting command at the input of said command unit.

23. An inverter according to claim 22 wherein said means for computing comprises digital computing means of the inverter referenced to the load current comprises digital computing means, a multiplexer controlled by an output from said digital computing means having as input quantity representing the act of component of the load current and the no load voltage of the d.c. voltage source, a sample and hold circuit having its data input coupled to the output of said multiplexer and having a sample input coupled to said computing means; an analog digital converter having its input coupled to the output of said sample and hold circuit and providing its output to said computing means; a digital to analog converter coupled to the output of said computing means and having its output coupled to said control device.

* * * * *